N. B. HENRY.
APPARATUS FOR GINNING COTTON.
APPLICATION FILED JAN. 2, 1917.
1,278,649.
Patented Sept. 10, 1918.
2 SHEETS—SHEET 1.
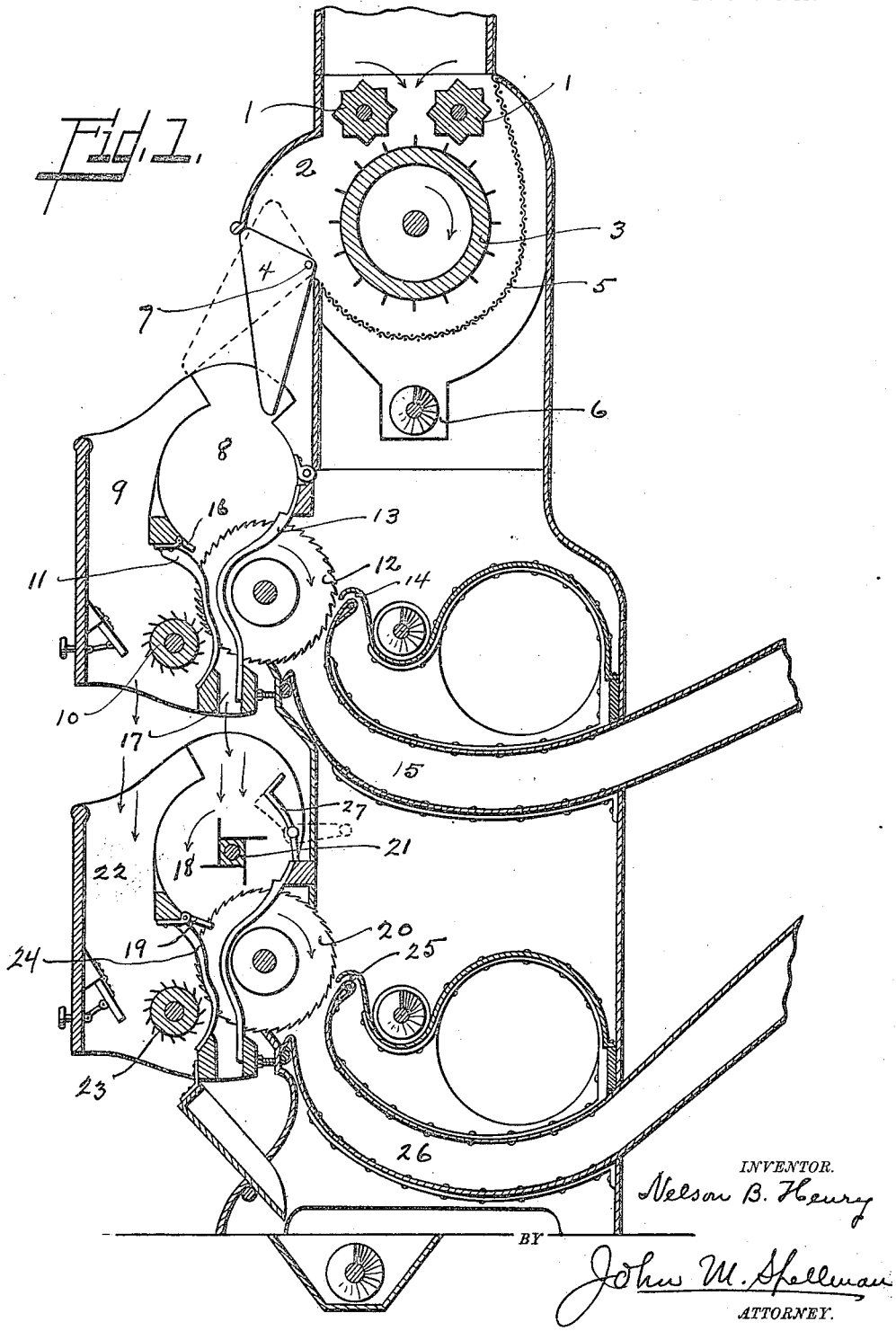
INVENTOR.
Nelson B. Henry
BY
John M. Spellman
ATTORNEY.

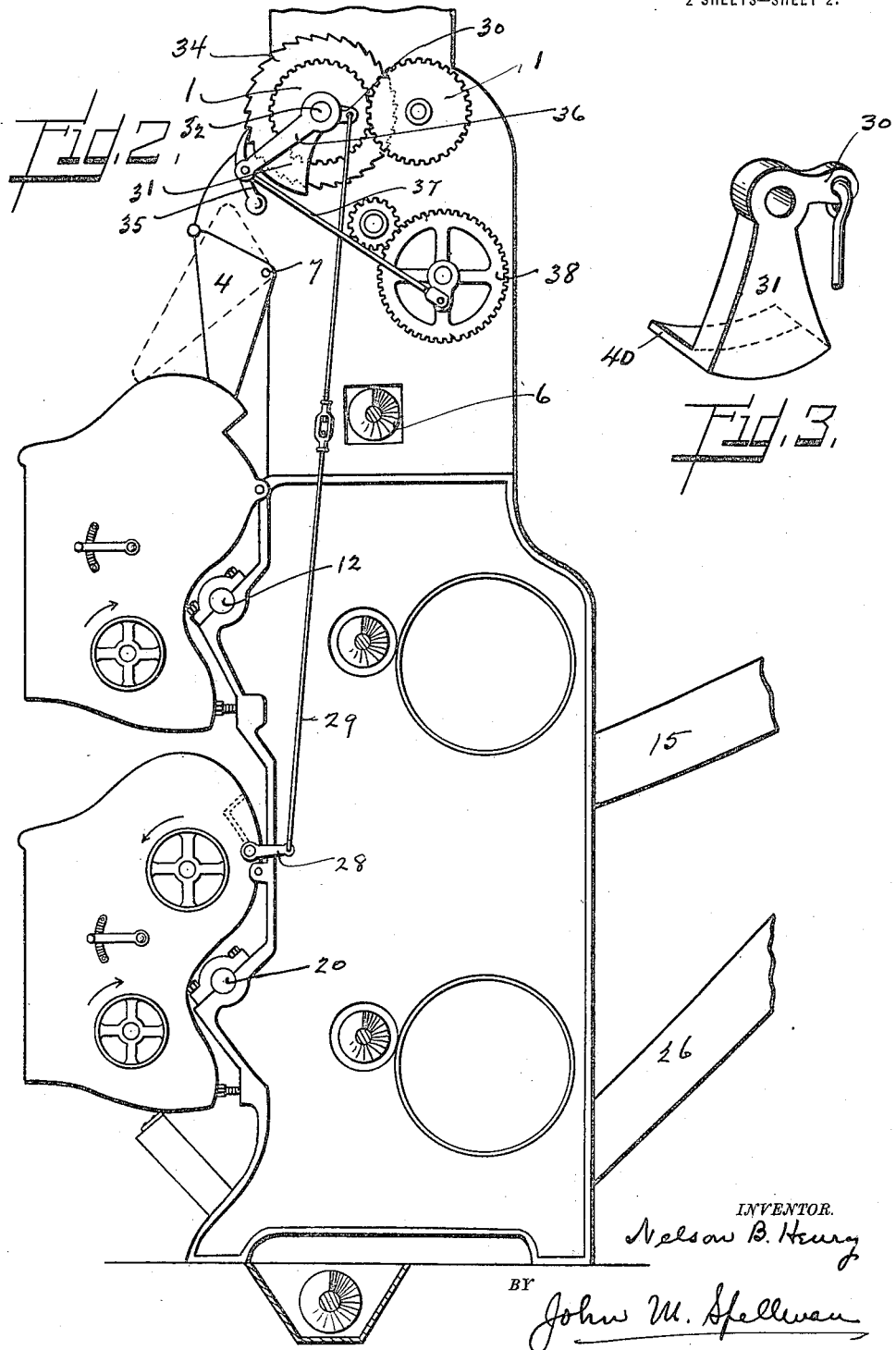

UNITED STATES PATENT OFFICE.

NELSON B. HENRY, OF ATLANTA, GEORGIA, ASSIGNOR TO THE MURRAY COMPANY, OF DALLAS, TEXAS, A CORPORATION OF TEXAS.

APPARATUS FOR GINNING COTTON.

1,278,649.  Specification of Letters Patent.  Patented Sept. 10, 1918.

Application filed January 2, 1917. Serial No. 140,191.

*To all whom it may concern:*

Be it known that I, NELSON B. HENRY, a citizen of the United States, residing at Atlanta, in the county of Fulton and State of Georgia, have invented certain new and useful Improvements in Apparatus for Ginning Cotton, of which the following is a specification.

My invention has relation to an improved apparatus for ginning cotton and in such connection it relates more particularly to the arrangement of parts whereby the ginning operation is accelerated and more perfectly carried on.

Heretofore in the ginning of cotton, the raw material was delivered to a feeder and fed therefrom to what is known as a roll box. A saw cylinder in revolving traverses this box and pulls or snags the cotton fiber from the roll and draws it through the seed-separating ribs. The fibers so conveyed by the saw cylinder is removed from the teeth of the saws either by a brush or by an air blast and delivered to a lint flue. Where the cotton is full of hulls a huller gin is employed in which the raw material is delivered to a hulling mechanism rather than to a roll box. This huller mechanism comprises a picker roll and huller ribs co-acting with the saw cylinder, the huller ribs permitting the cotton and seed to be drawn by the saws into the roll box and to the seeding ribs, the hulls only being caught by said huller ribs.

Whether the gin be an ordinary gin, or a huller gin, the ginning operation has heretofore been comparatively slow and relatively imperfect in that it was impossible with a single roll box to present the raw material to the gin saws in such relative compactness and with such speed as to permit the gin to be run at a speed which would secure the maximum output with the minimum waste of fiber. Thus if the cotton were fed too rapidly or rather with such rapidity as the revolving saw cylinder would theoretically require, the roll box would become choked up and the gin would not operate advantageously. If however the speed of the feeding of the raw material to the roll box was reduced, the saw cylinders did not take off the fiber to their fullest capacity and the output of the gin was therefore decreased. Again if the roll in roll box was of a density less than that theoretically required, the saws could not take off all the valuable fibers from the seed but a large proportion passed with the seed to the seed conveyer.

My present invention is designed to solve the foregoing problems and in the carrying out of my invention, the raw material is presented initially in a relatively loose roll to the ginning saws, and thereafter the seeds with attached fiber are presented in a relatively compact roll to a second saw cylinder which effectually removes the valuable fibers from the seed escaping from the first ginning operation. I thus secure the maximum of speed at which the cotton can be passed through the gin and also secure the extraction of a maximum amount of the fiber without an appreciable increase in power to run the gin and with but a slight increase in the initial cost of construction of the gin. I also secure by my invention great economy of space in that a single gin of my present construction will fill the requirements of what now is filled by a stand of three or four gins.

To redesign or reconstruct the gin so that it may be capable of carrying out successfully this double ginning of the cotton requires certain changes in form and location of the parts and requires also the provision of means whereby should the lower or second roll box become choked up or the roll therein become too dense for proper manipulation, the feeding of the raw material to the first roll box may be automatically regulated. These necessary changes in form and location and the means for automatically governing the feed of the raw cotton to the gin by the condition of the second roll box constitute my present invention.

The nature and scope of my invention will be more fully understood from the following description taken in connection with the accompanying drawings forming part hereof, in which—

Figure 1 is a vertical sectional view of a gin embodying the main features of my invention, Fig. 2 is a side elevational view thereof, and Fig. 3 is a perspective view of the shoe or guard forming part of the feed regulating mechanism.

In the drawings I have illustrated for example a huller gin in which the fiber or lint is removed from the saws by means of an air blast. It will be understood from the outset that the invention may be embodied in a gin of any known type whether the same have the huller mechanism or not and whether an air blast or a brush be the preferred means for removing the lint from the saws.

Referring to the drawings 1—1 represent the feeding rollers coöperating in a hopper 2 with a picker roll 3 to properly feed the raw material to a chute 4. The picker roll is designed to carry the cotton over a screen breast 5 whereby the dirt or trash loosened from the cotton during its travel through hopper 2 may escape to the dirt and trash conveyer 6.

The chute 4 in case of a huller gin is pivoted as at 7 so that it may discharge the raw material selectively to the upper roll box 8 or to the huller chamber 9 and thence to the picker roll 10 coöperating with the huller ribs 11 in the presentation of the fiber separated from the hulls to the saws of the upper saw cylinder 12. This cylinder traverses the lower end of the roll box 8 and coöperates with the seeding ribs 13. The cotton adhering to the teeth of the saws is blown by an air blast delivered from nozzle 14 into a lint flue 15.

The roll box 8 has at its discharge or throat a notched bar or lambrequin 16 projecting from the side of the roll box toward the saws. In the usual construction and arrangement of such bar 16, the prongs or fingers project into the spaces between the saws of the saw cylinder and thus serve to more or less obstruct the discharge from the roll box and insure the formation of a tight or relatively dense roll for presentation to the saws. Inasmuch as it is essential in my improved gin to present the cotton and seed to the saws 12 in a relatively tenuous roll, the notched bar 16 is considerably shortened in width so that its flanges or prongs do not enter the space between the saws but stop some distance in front of the periphery of the saw cylinder. This construction and arrangement permits of the rapid but somewhat incomplete separation of the cotton fiber from the seeds, some portion of the fiber remaining on the seeds as they pass downward through the passageway or outlet 17 below the saw cylinder and at the bottom of the seed ribs. Below this passageway 17 is arranged a second roll box 18 to receive the seed with adhering fiber as it escapes from the upper roll box 8. This lower roll box 18 has at its lower end or throat a notched bar or lambrequin 19 the prongs or fingers of which extend into the spaces between the saws of the lower or second saw cylinder 20, to insure, in the roll box 18, the formation of a relatively tight or dense roll. Within the roll box 18 revolves a float 21 which serves to revolve the relatively heavy body or roll of seed within the box 18.

Where, as illustrated, the gin embodying my invention is a huller gin, there is provided a second or lower huller chamber 22 with picker roll 23 and huller ribs 24. The upper huller chamber 9 is arranged to discharge its hulls with adhering fiber into the lower huller chamber 22 in which the picker roll 23 coöperates with the ribs 24 in performing another hulling operation.

The residue from roll box 8 after the material in a loose roll has been subjected to a ginning operation is next presented to the gin saws 20 in a relatively compact and dense roll. In this step the fiber clinging to the saw teeth of cylinder 20 may be removed by an air blast from nozzle 25 and discharged into a lint flue 26. In practice both lint flues 15 and 26 discharge preferably into a common flue not shown.

To insure the proper operation of the gin at maximum speed and with the economic removal of the fiber and without human supervision there is provided a means whereby the degree of compactness of the roll in the lower roll box automatically regulates the feed of raw material through the feed rollers into the upper or loose roll box 8. While such a means is illustrated in its preferred form in the drawings, it is to be understood that changes or modifications of this form without change in function of the means will lie within the purview of my invention.

The means illustrated in the drawings comprises a flexible or pivoted portion 27 of the wall of the lower roll box 18, a crank arm 28 operated or controlled in its movement by the movement of said flexible or pivoted portion 27, a link or tie rod 29 connecting the crank arm 28 with an arm 30 extending eccentrically from a shoe 31 pivotally mounted upon the shaft 32 of one of the feed rollers 1.

As in the ordinary gin the two rollers 1 are geared together and the feeding movement of the rollers 1 is secured by attaching to shaft 32 of one feed roller a ratchet wheel 34 operated by a weighted pawl 35 swinging loosely at the free end of an arm 36 loosely mounted at its other end upon said shaft 32. The pawl arm 36 is oscillated by a link 37 eccentrically connected with a gear 38 driven in the ordinary manner. As the gear 38 is rotated the pawl 35 is alternately advanced and retracted, the pawl 35 normally engaging the teeth of the ratchet 34 during its forward or advancing movement.

In the present device the shoe 31 is provided with a lip or rim 40 extending inward to cover a portion of the periphery of the ratchet wheel 34. According to the movement of the shoe 31 this rim 40 will be either